United States Patent [19]
Inoue et al.

[11] Patent Number: 5,859,815
[45] Date of Patent: Jan. 12, 1999

[54] APPARATUS AND METHODS FOR MINIMIZING NON-RECORDABLE AREAS AND NUMBERS OF PARTS PER TRACK ON A DIGITAL RECORDING MEDIUM

[75] Inventors: Hiraku Inoue, Kanagawa; Yuji Arataki, Tokyo, both of Japan

[73] Assignee: Sony Corporation, Tokyo, Japan

[21] Appl. No.: 357,643

[22] Filed: Dec. 15, 1994

[30] Foreign Application Priority Data

Dec. 24, 1993 [JP] Japan .................................. 5-347329

[51] Int. Cl.$^6$ .............................. G11B 17/22; G11B 3/90
[52] U.S. Cl. ................................................. 369/32; 369/58
[58] Field of Search ................................ 369/32, 30, 48, 369/49, 47, 54, 58, 33

[56] References Cited

U.S. PATENT DOCUMENTS

5,613,112  3/1997  Nagashima ............................ 369/32 X

Primary Examiner—Paul W. Huber
Attorney, Agent, or Firm—Limbach & Limbach L.L.P.

[57] ABSTRACT

The present invention provides a method for recording digital data utilizing a digital recording system having a recording area. The method includes a recording step and an erasing step. The recording step includes recording a first digital sequence in the recording area. The first digital sequence is then both preceded by and followed by a non-recordable area. The erasing step includes erasing the first digital sequence, as well as both non-recordable areas from the recording area, pursuant to a command to erase the first digital sequence. A start address and an end address is kept in a management area of the recording medium for each digital sequence stored in the recording area. When a command to erase the first digital sequence is received, a magnetic head and an optical pick-up sequentially erase from an address following an end address of a preceding sequence to an address preceding a start address of a succeeding sequence. Information on start and end addresses of digital sequences and their positions with respect to each other both physically on the disk and as they are read pursuant to a read command is stored in tabular form in the management area. An apparatus for performing the above operations is also provided.

18 Claims, 9 Drawing Sheets

|   | 1 | 2 | 3 | 4 |
|---|---|---|---|---|
| 0 | Sync | Sync | Sync | Sync |
| 1 | Sync | Sync | Sync | Sync |
| 2 | Sync | Sync | Sync | Sync |
| 3 | cluster | | Sector | Mode |
| 4 | | | | |
| 5 | | | | |
| 6 | | | | |
| 7 | | | | |
| 8 | | | | |
| ⋮ | | | | |
| 586 | | | | |
| 587 | | | | |

Rows 0–3: HEADER
Rows 4–587: DATA AREA (2336 BYTES)

FIG. 3

U-TOC SECTOR 0

|   | 1 | 2 | 3 | 4 |
|---|---|---|---|---|
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | Cluster | | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | FirstTNO | Last TNO |
| 8 | 00000000 | 00000000 | 00000000 | Used Sectors |
| 9 | 00000000 | 00000000 | 00000000 | 00000000 |
| 10 | 00000000 | 00000000 | 00000000 | Disc Serial No |
| 11 | Disc ID | | P-DFA | P-EMPTY |
| 12 | P-FRA | P-TN01 | P-TN02 | P-TN03 |
| 13 | P-TN04 | P-TN05 | P-TN06 | P-TN07 |
| 14 | P-TN08 | P-TN09 | P-TN010 | P-TN011 |
| 15 | P-TN012 | P-TN013 | P-TN014 | P-TN015 |
| 16 | P-TN016 | ........ | | |
| 17 | | | | |
| 73 | | | | |
| 74 | P-TN0248 | P-TN0249 | P-TN0250 | P-TN0251 |
| 75 | P-TN0252 | P-TN0253 | P-TN0254 | P-TN0255 |
| 76 | 00000000 | 00000000 | 00000000 | 00000000 |
| 77 | 00000000 | 00000000 | 00000000 | 00000000 |
| 78 | Start address | | | Track mode |
| 79 | End address | | | Link-P |
| 80 | Start address | | | Track mode |
| 81 | End address | | | Link-P |
| 82 | Start address | | | Track mode |
| 83 | End address | | | Link-P |
| 84 | Start address | | | Track mode |
| 85 | End address | | | Link-P |
| 86 | | | | |
| ... | | | | |
| 586 | Start address | | | Track mode |
| 587 | End address | | | Link-P |

INNER CIRCUMFERENCE OF DISK ← | ERASE ↓ → OUTER CIRCUMFERENCE OF DISK

| 9 | 2 | 6 | 4 | 5 | 11 | 3 | 1 | 10 | 12 | 8 | 7 |

FIG. 13B

| PART No. | PRECEDING PART No. | SUCCEEDING PART No. | TNO |
|---|---|---|---|
| 1 | 3 | 10 | 3 |
| 2 | 9 | 6 | 1 |
| 3 | 11 | 1 | 1 |
| 4 | 6 | 5 | 3 |
| 5 | 4 | 11 | 2 |
| 6 | 2 | 4 | 1 |
| 7 | 8 | 0 | 0 |
| 8 | 12 | 7 | 0 |
| 9 | 0 | 2 | 3 |
| 10 | 1 | 12 | 1 |
| 11 | 5 | 3 | 3 |
| 12 | 10 | 8 | 0 |

PTBL

FIG. 13C

| PART No. | PRECEDING PART No. | SUCCEEDING PART No. | TNO |
|---|---|---|---|
| 1 | 3 | 10 | 3 |
| 2 | 9 | 6 | 1 |
| 3 | 11 | 1 | 1 |
| 4 | 6 | 5 | 3 |
| 5 | 4 | 11 | 0 |
| 6 | 2 | 4 | 1 |
| 7 | 8 | 0 | 0 |
| 8 | 12 | 7 | 0 |
| 9 | 0 | 2 | 3 |
| 10 | 1 | 12 | 1 |
| 11 | 5 | 3 | 3 |
| 12 | 10 | 8 | 0 |

PTBL

APPARATUS AND METHODS FOR MINIMIZING NON-RECORDABLE AREAS AND NUMBERS OF PARTS PER TRACK ON A DIGITAL RECORDING MEDIUM

BACKGROUND OF THE INVENTION

1. Field of the Invention

The present invention relates to a method and an apparatus for recording digital data. More particularly, the present invention relates to a method and an apparatus for recording digital data on a recording medium on an discrete basis in predetermined amounts.

2. Description of the Related Arts

Recording and reproducing apparatuses have been proposed which use a magneto-optical disc as a recording medium and record an analog audio signal on the magneto-optical disc by converting the analog signal into a digital audio signal. In such recording and reproducing apparatuses, digital data obtained by compressing a digital audio signal are continuously or discretely recorded on a magneto-optical disc in predetermined amounts.

Specifically, for recording, a digital audio signal obtained by performing digital conversion on an analog audio signal is divided into blocks in predetermined cycles and is subjected to data compression block by block (such a block is hereinafter referred to as a "sound group"). The compressed data are subjected to an encoding process for correcting errors and a modulation process for recording. The digital data which have been subjected to these processes are supplied to a magnetic head. A vertical magnetic field which has been modulated based on digital data supplied by the magnetic head is supplied to a magneto-optical disc to which an optical beam is directed by an optical head simultaneously to record the data thereon. The magneto-optical disc is formed with a recording track in the form of a spiral extending from the inner circumference to the outer circumference thereof along a groove which has been formed thereon in advance.

Figure 1:
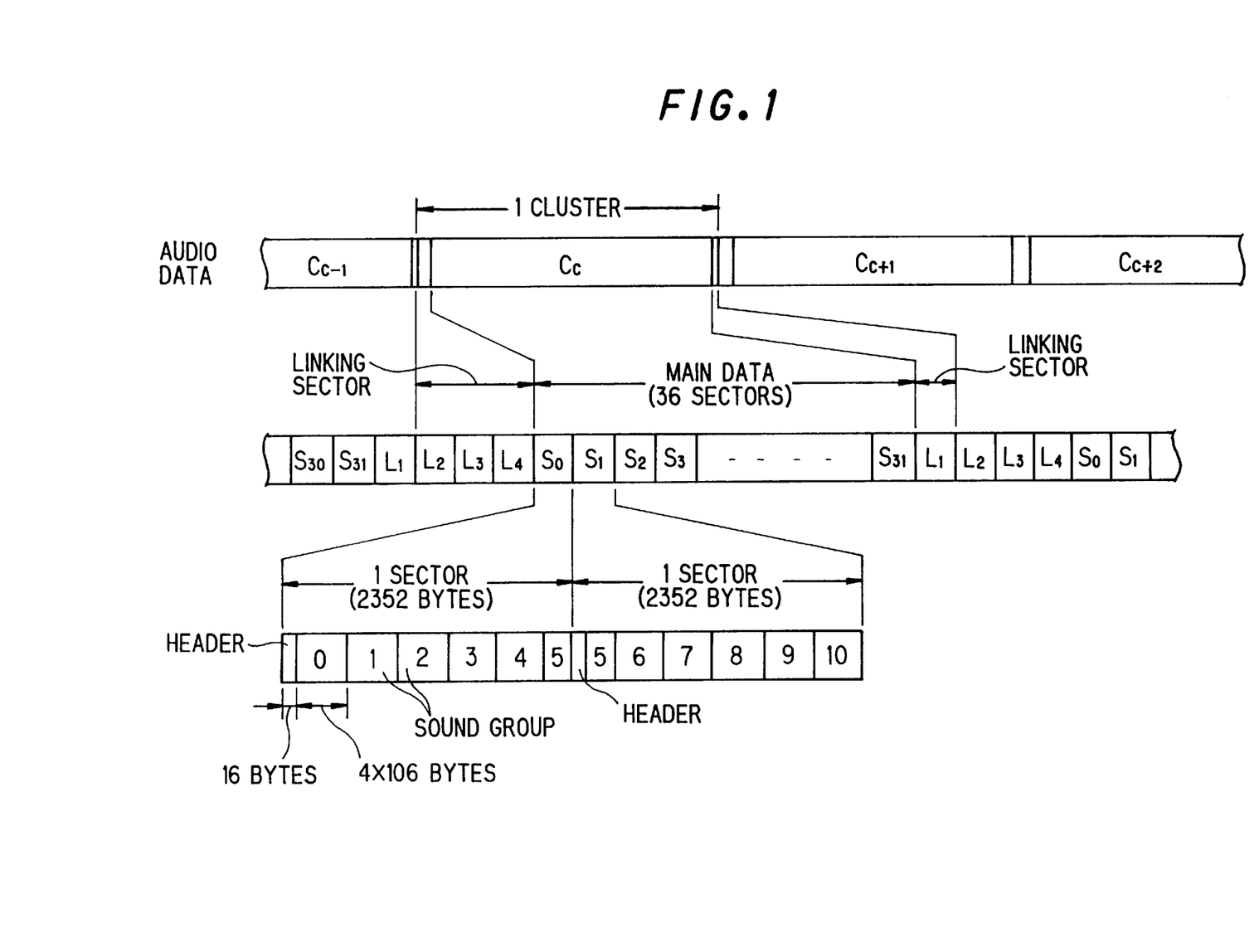
FIG. 1 illustrates the format of a recorded signal.

FIG. 1 shows the format of digital data which have been compressed from among signals recorded on a magneto-optical disc. The digital data are sequentially distributed to clusters $C_c$, $C_{c+1}$, $C_{c+2}$, etc., each cluster being constituted by 36 sectors, i.e., sectors L2 through L4, S0 through S31 and L1.

The sectors S0 through S31 are data sectors which include main data such as digital audio data. The sectors L2 through L4 and L1 are referred to as "linking sectors" and are used for connecting a cluster $C_c$ to the preceding cluster $C_{c-1}$ and the succeeding cluster $C_{c+1}$. Among these linking sectors, the sectors L2 and L3 are sectors for run-in blocks; the sector L4 is a sector for sub-data (the contents of which are undefined); the sector L1 is a sector for run-out blocks. The size of each of these sectors is 2352 bytes and, therefore, one cluster contains 84672 bytes (=2352 bytes×36 sectors).

Recording on a magneto-optical disc is performed on a cluster basis, and it is recognized as described above that the clusters are discretely recorded on a magneto-optical disc. Therefore, a plurality of clusters which constitute continuous digital data are not necessarily physically continuous on a magneto-optical disc.

Figure 2:
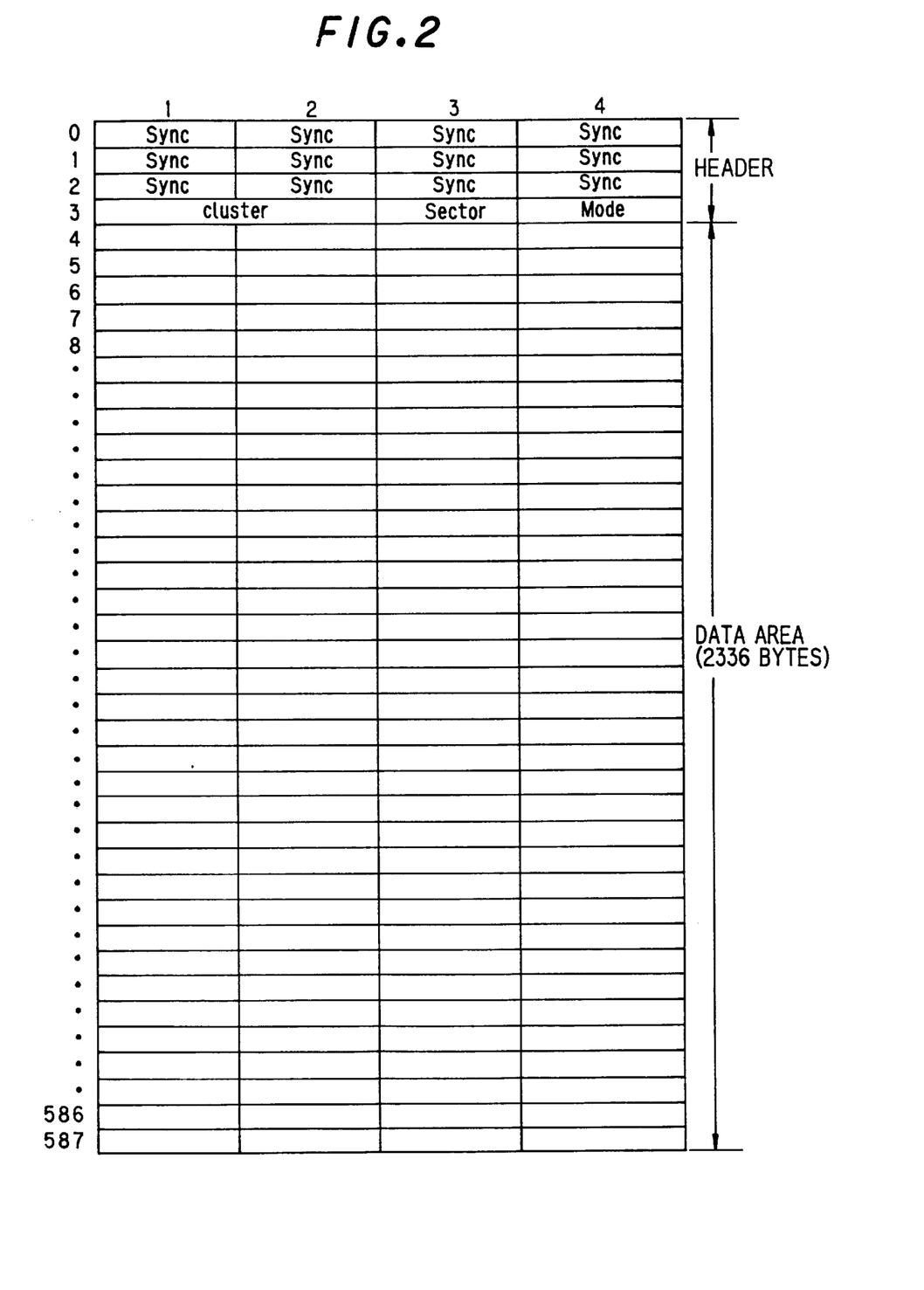
FIG. 2 illustrates the format of a sector.

The detail of the sectors is shown in FIG. 2 wherein an area constituted by one sector, i.e., 2352 bytes, is illustrated in the form of a table which is constituted by 588 bytes and four bytes in the vertical and horizontal directions. In the following description, an area constituted by four bytes in the horizontal direction is treated as one address, and addresses 0 through 587 are assigned in the vertical direction. Therefore, the size of one address is four bytes.

Addresses 0 through 3 constitute a header, and the 12 bytes in addresses 0 through 2 are synchronization signals, labelled sector Sync, having a predetermined bit pattern. The first two bytes in address 3 represent the cluster number of the cluster to which this sector belongs (the cluster number of the cluster on the disc), labelled Cluster, and the next one byte represents the sector number of the sector, labelled Sector. The last one byte, labelled Mode, is assigned to data which indicates type of disc. For example, if an audio signal is recorded, Mode=2.

The 584 addresses from address 4 up to address 587 (an area of 2336 bytes) constitute a data area which contains audio data for 5.5 sound groups. Specifically, as also shown in FIG. 1, addresses up to address 4 of each sector serve as a header as described above. In an even-numbered sector, however, addresses from address 4 up to address 534 are grouped into five areas each containing 106 addresses. Those areas are treated as sound groups 0 through 4, respectively. The area constituted by the remaining 53 addresses from address 535 up to address 587 is treated as the first half of a sound group 5.

In the odd-numbered sector succeeding this even-numbered sector, an area constituted by 53 addresses from address 5 up to address 57, is treated as the second half of the sound group 5; addresses 58 through 587 are grouped into five areas each containing 106 addresses; and those groups are treated as sound groups 6 through 10, respectively.

The above-described formats of clusters, sectors and sound groups equally apply to a disc except that the contents of clusters are continuous in point of time but the physical positions of clusters on a magneto-optical disc can be discrete.

As described above, since it is recognized that digital audio data are discretely recorded on a magneto-optical disc on a cluster basis, it is necessary to manage the positions in the recording area of a magneto-optical disc wherein digital audio data are recorded. For this purpose, a management data area for recording management data which are used for managing the utilization of clusters is provided at the innermost circumferential portion of a magneto-optical disc.

Such a management data area is referred to as "TOC (Table of Contents)", and the above-described magneto-optical disc is provided with a "P-TOC" which cannot be rewritten by a user and a "U-TOC" which can be rewritten by a user. In addition to the cluster management table, the U-TOC records the name of the disc, the titles of pieces of music and date and time of recording where the audio data are music data. In the P-TOC, data or the like indicating the type of the disc are prerecorded by means of pits as physical irregularities.

Figure 3:
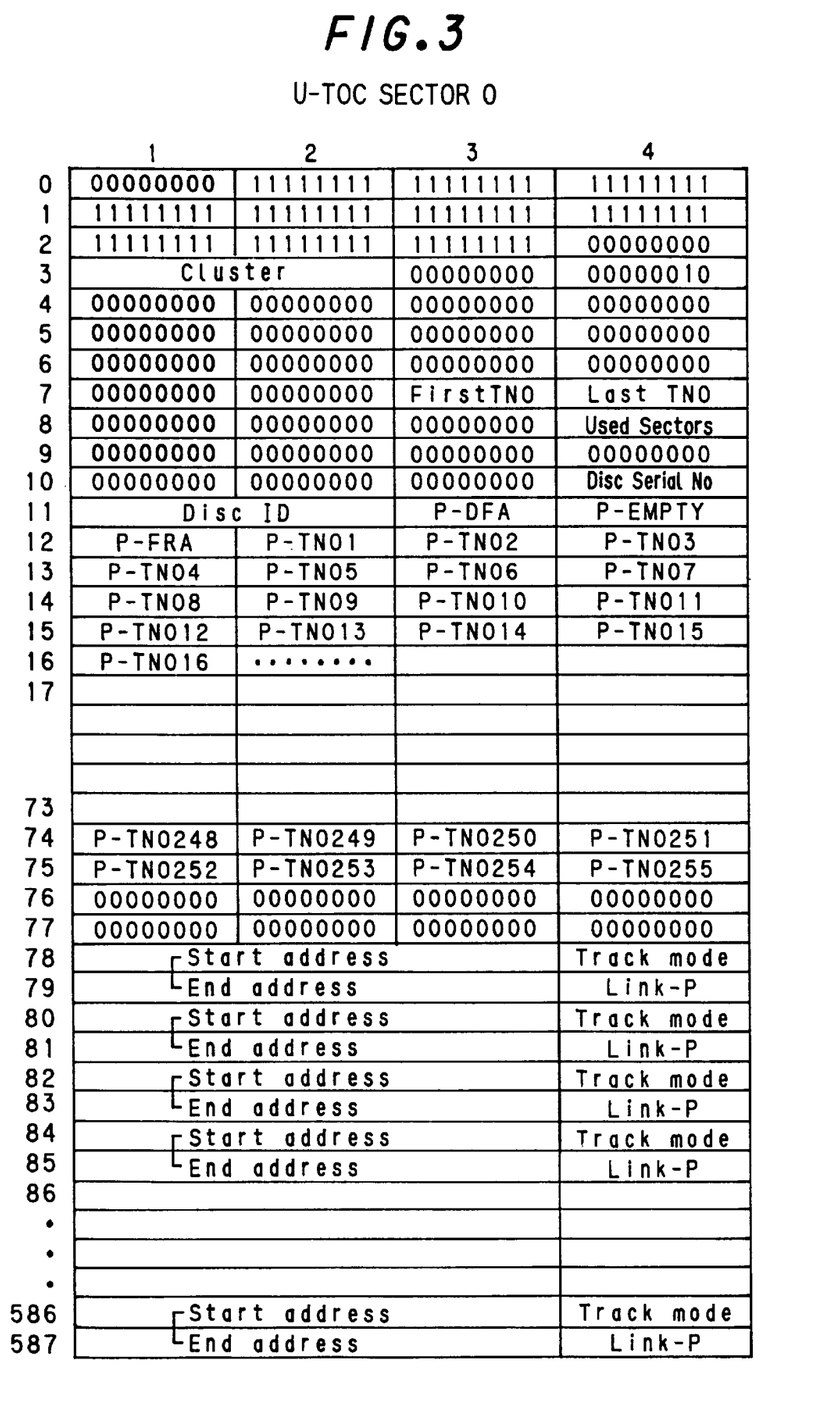
FIG. 3 illustrates a sector 0 of a U-TOC.

Sector 0 which is the first sector of the cluster wherein the U-TOC is prepared is allotted to the cluster management table. FIG. 3 shows the structure of sector 0. The following example is a description of a configuration for recording of music information as recorded digital data.

Specifically, in the main data area, a pointer P-TNOn (n=1 through 255) related to the position where the n-th piece of music is recorded is written in each of the bytes from the second byte in address 12 up to the fourth byte in address 75. Start addresses and end addresses indicating the start and end positions of 255 parts of music are written in the first, second and third bytes in addresses 78 through 587.

In this case, the address pointed to by the pointer P-TNOn is the address wherein the start address of the n-th piece of music is written, and the succeeding address is the address wherein the end address is written. If P-TNOn=m, the start address of the n-th piece of music is written in an address (76+m×2), and the end address of the n-th piece of music is written in an address (76+m×2+1).

The clusters on the magneto-optical disc are used in a continuous manner from a position in which recording is started indicated by a start address up to a position in which recording is finished indicated by an end address. A continuous recording area specified by a pair of start and end addresses is hereinafter referred to as a "part". The number of such parts is 255 which is equal to the number of pairs of start and end addresses.

When clusters on the magneto-optical disc cannot be used in a continuous manner for a single piece of music, i.e., when a plurality of parts are used for a single piece of music, it is necessary to know the order in which those parts are used. A link pointer Link-P is prepared in the fourth address following each of the end addresses written in the addresses 78 through 587. A link pointer Link-P specifies the start address of the part succeeding the part to which the link pointer Link-P belongs as a part pointer P-TNOn does. If there is no succeeding part, i.e., the part is the last part of a piece of music, the link pointer Link-P is set to, for example, "0".

Mode data, labelled Track Mode, indicate the processing mode for each part and are written in the fourth part following each of the start addresses in the addresses 78 through 587. This makes it possible to identify whether or not a part is inhibited from being copied and written and whether emphasis is put on it or not.

The first two bytes of address 11 are a disc identification code labelled Disc ID. The next one byte is a pointer, labelled P-FRA, P-DFA indicating a defective area in the main data area. The last one byte is a pointer, labelled P-FRA, indicating the leading address of an area in the U-TOC wherein neither start address nor end address is written. Assume that a recordable area wherein digital data can be recorded is referred to as a "free area". Then, the first byte in address 12 is a pointer P-FRA indicating this free area. The pointers P-DFA and P-FRA point in the same manner as that of the pointer P-TNOn.

Figure 4:
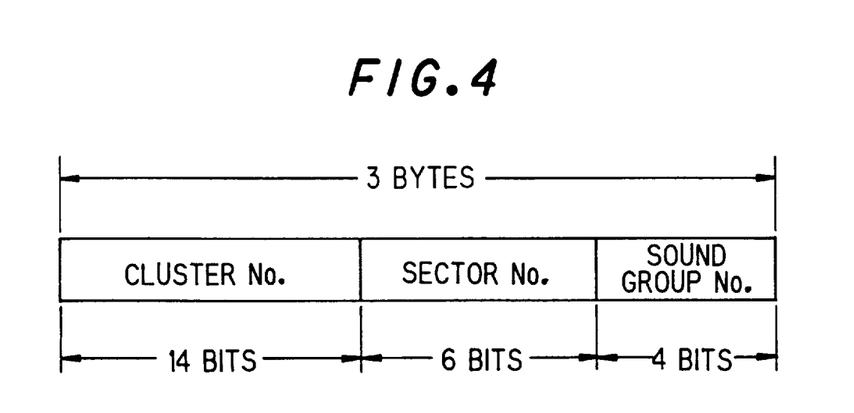
FIG. 4 illustrates the format of an address.

FIG. 4 shows the formats of a start address and an end address. Specifically, a start address and an end address are both data consisting of three bytes wherein the first 14 bits indicate the cluster number of the cluster on the optical disc; the next six bits indicate the sector number of a sector in the cluster; and the last four bits indicate the sound group number of a sound group in the sector. Therefore, the use of such start and end addresses makes it possible to manage and identify positions on a magneto-optical disc on a sound group basis.

The above-described formatting of digital data recorded on a magneto-optical disc allows additional recording of digital data based on music information, overwrite-recording and erasing of only one piece of music. Instead of actually erasing digital data in a part, the data in the part can be equivalently erased only by rewriting the data in the U-TOC to update the U-TOC so that it indicates that the part is a free area.

Figure 5:
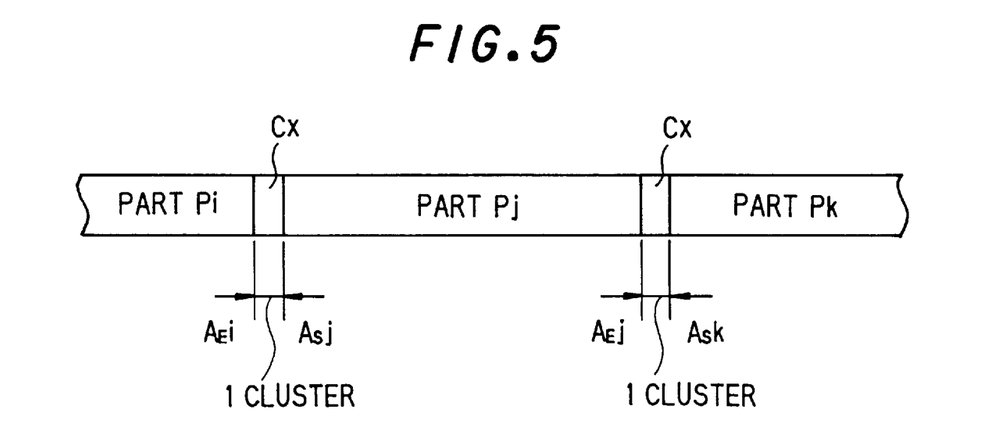
FIG. 5 illustrates how to record parts.

In a recording and reproducing apparatus as described above, when a plurality of parts Pi, Pj, Pk, etc. are physically continuously formed on a magneto-optical disc as shown in FIG. 5, non-recording areas $C_x$ each constituted by one cluster are provided between those parts. The length of one cluster corresponds to about three tracks (i.e., three turns of the disc) on average. As a result, even if the position of an optical beam for recording directed by the optical head is moved in the direction of the length or width of the recording track due to vibration or the like during recording, the position reached by the movement will be in a non-recording area $C_x$. This protects the contents recorded in the adjacent positions against corruption.

However, recording involving the non-recording areas $C_x$ will result in a decrease in the areas among the recording area of a magneto-optical disk which can be actually used for recording due to an increase in the number of the non-recording areas $C_x$ if a single piece of music is recorded in a multiplicity of parts after repeated erasing and recording operations.

Further, as apparent from the above description on the U-TOC, the U-TOC does not directly manage the non-recording areas $C_x$. For example, assume that the data recorded in the part Pj in FIG. 5 are erased to change the area wherein the part Pj has been recorded to a free area and, thereafter, other digital data are recorded in this free area (the former part Pj). Then, the first cluster of this free area (the former part Pj) is appointed to be a non-recording area $C_x$, and new digital data are recorded starting with the cluster that follows the new non-recording area $C_x$. As a result, the newly recorded part will be preceded by a non-recording area $C_x$ consisting of two clusters, one of which is the non-recording area of the former part Pj.

In addition, as a single piece of music is shared by an increasing number of parts as a result of repeated erasing and recording, the U-TOC becomes unable to manage all digital data recorded on the magneto-optical disc because the maximum number of parts which can be managed by the U-TOC is 255.

One possible solution to this problem is as follows. When a piece of music is erased, from among the parts which have been erased, recording areas whose lengths are equal to or longer than four clusters are recorded in the U-TOC as areas usable for recording, i.e., free areas.

However, if recording areas having lengths equal to or longer than four clusters are recorded in the U-TOC as free areas, there is a possibility that areas shorter than four clusters are produced after repeated erasing and recording. This results in a reducyion in the areas of the recording area of the magneto-optical disc which can be actually used for recording.

Further, some users repeatedly record data having a short duration corresponding to less than four clusters. In this case, even if such data are erased from the recording area of the magneto-optical disc, the erased area will not be managed by the U-TOC as a free area.

When new digital data are written over old digital data, i.e., when overwriting is performed, a non-recording area $C_x$ is formed as in the case of erasing as described above. However, the U-TOC does not directly manage non-recording areas $C_x$. For example, if new digital data are written over the area of the part Pj in FIG. 5, the first cluster of the part Pj is appointed as a non-recording area $C_x$ as in the case of erasing, and the new digital data are overwritten starting with the cluster that follows this new non-recording area $C_x$. As a result, the newly formed part will be preceded by a non-recording area $C_x$ having a size corresponding to two clusters. Therefore, repeated overwriting operations will also result in a decrease in areas of the recording area of the optical disc which can be actually used for recording.

In order to prevent areas of a magneto-optical disc which can be used for recording from being decreased, it has been proposed to perform processing as described below during erasing. Assume that the part Pj in FIG. 5 is to be erased during an erasing operation performed in the above-described apparatus Then, the part Pj is managed on the U-TOC as a free area. The non-recording areas $C_x$ provided before and after the part Pj are also regarded as free areas and are managed on the U-TOC. In other words, when TOC data in the U-TOC are updated to treat the part Pj as a free area, the area from the non-recording area $C_x$ preceding the part Pj up to the non-recording area $C_x$ succeeding the part Pj is now regarded as the part Pj and is managed on the U-TOC as a free area.

In the case of the overwriting of digital data, the non-recording area $C_x$ preceding the part Pj on which overwriting is to be performed is similarly recorded as the part Pj, and new digital data are written over the area wherein old digital data are recorded and the non-recording area.

In this way, the non-recording areas $C_x$ are included in the free area when erasing is performed. This makes it possible to prevent the areas in the recording area of a magneto-optical disc which can be used for recording from being decreased. In the case of the overwriting of new digital data, there will be no decrease in recordable areas for the same reason.

As apparent from above, however, the U-TOC does not directly manage non-recording areas $C_x$. Therefore, to register the part Pj and the non-recording areas $C_x$ before and after the part Pj as a free area, it is necessary to search all the start and end addresses registered in the U-TOC for an end address AEi which is the nearest end address preceding the start address ASj of the part Pj and for a start address ASk which is the nearest start address succeeding the end address AEj of the part Pj.

Thus, in erasing a piece of music recorded using many parts or many pieces of music, many parts are erased, and necessary addresses must be found for all of such parts from among all the start and end addresses registered in the U-TOC.

This results in a significant increase in the time required for the erasing of digital data.

SUMMARY OF THE INVENTION

It is therefore an object of the present invention to provide a method for recording digital data which solves the above-mentioned problems.

It is another object of the present invention to provide an apparatus for recording digital data which solves the above-mentioned problems.

According to the present invention, there is provided a method for recording digital data utilizing a recording medium which includes a recording area for recording data and on which management data indicating the orders for the reproduction of the data recorded in the recording area and for the reproduction and recording of data into the recording area are recorded. According to this method for recording, data are discretely recorded in the recording area of the recording medium, with a predetermined amount of data serving as a unit of recording. Data are recorded on the recording medium data in amounts each of which is an integral multiple of the unit of recording so that they are continuous in point of time. In recording data, a non-recording area is provided between the data in an amount which is an integral multiple of the unit of recording and the data in the position on the recording medium physically precedent thereto in an amount which is an integral multiple of the unit of recording. To erase data on the recording medium, data are erased, based on the management data, in the addresses from the address following the end address of the data in the position on the recording medium physically preceding the data to be erased in an amount which is an integral multiple of the unit of recording up to the address preceding the first address of the data in the position on the recording medium following the data to be erased in an amount which is an integral multiple of the unit of recording.

According to the present invention, there is provided a method for recording digital data utilizing a recording medium which includes a recording area for recording data and on which management data indicating the orders for the reproduction of the data recorded in the recording area and for the reproduction and recording of data into the recording area are recorded. According to this method for recording, data are discretely recorded in the recording area of the recording medium, with a predetermined amount of data serving as a unit of recording. Data are recorded on the recording medium in amounts each of which is an integral multiple of the unit of recording so that they are continuous in point of time. In recording data, a non-recording area is provided between the data to be recorded in an amount which is an integral multiple of the unit of recording and the data in the position on the recording medium physically precedent thereto in an amount which is an integral multiple of the unit of recording. To erase data on the recording medium, data are erased, based on the management data, from the address following the end address of the data in the position on the recording medium physically preceding the data to be erased in an amount which is an integral multiple of the unit of recording up to the address preceding the first address of the data in the position on the recording medium following the data to be erased in an amount which is an integral multiple of the unit of recording. Prior to a recording or erasing operation, the management data on the recording medium associated with the erased data are rewritten into data indicating that data can be recorded.

According to the present invention, there is provided an apparatus for recording digital data. The recording apparatus utilizes a recording medium which includes a recording area for recording data and on which management data indicating the orders for the reproduction of the data recorded in the recording area and for the reproduction and recording of data into the recording area are recorded. Data are discretely recorded in the recording area of the recording medium, with a predetermined amount of data serving as a unit of recording. The recording apparatus includes a recording and reproducing portion, storage portion and a control portion. The recording and reproducing portion records data on the recording medium and reads out the management data on the recording medium. The storage portion stores the management data read out by the recording and reproducing portion. The control portion controls the operation of the recording and reproducing portion based on the management data stored in the storage portion. The control portion controls the recording and reproducing portion to record data on the recording medium in amounts each of which is an integral multiple of the unit of recording so that they are continuous in point of time, with a non-recording area provided between the data in an amount which is an integral multiple of the unit of recording and the data in the position on the recording medium physically precedent thereto in an amount which is an integral multiple of the unit of recording. The control portion controls the recording and reproducing portion to erase data from the recording medium based on the management data by erasing the data in the addresses from the address following the end address of the data in the position on the recording medium physically preceding data to be erased in an amount which is an integral multiple of the unit of recording up to the address preceding the first address of the data in the position on the recording medium following the data to be erased in an amount which is an integral multiple of the unit of recording.

According to the present invention, there is provided a method for recording digital data utilizing a recording medium which includes a recording area for recording data and on which management data indicating the orders for the reproduction of the data recorded in the recording area and for the reproduction and recording of data into the recording area are recorded, wherein a plurality of data are discretely recorded in the recording area of the recording medium, with a predetermined amount of data serving as a unit of recording. According to this recording method, data are recorded on the recording medium in parts each constituted by data in an amount which is an integral multiple of the unit of recording so tahat they are continuous in point of time, with a non-recording area provided between a recorded part and the part in the position on the recording medium physically precedent thereto. To erase data on the recording medium, data are erased, based on the management data, in the addresses from the address following the end address of the part in the position on the recording medium physically preceding the part constituting the data to be erased up to the address preceding the first address of the data in the position on the recording medium following the part constituting the data to be erased.

The present invention makes it possible to prevent reduction in recordable area on a recording medium during the recording of data on the recording medium by recording data while providing a non-recording area between the data being recorded and the data which is physically precedent thereto on the recording medium and by erasing data from the address following the end address of the data physically preceding the data to be erased on the recording medium up to the address preceding the first address of the data in the position on the recording medium following the data to be erased.

DETAILED DESCRIPTION OF THE PREFERRED EMBODIMENTS

A first embodiment of a method and an apparatus for recording digital data according to the present invention will now be described with reference to the accompanying drawings. In the embodiments described below, digital audio data and a magneto-optical disc will be taken as examples of digital data and a recording medium, respectively.

Figure 6:
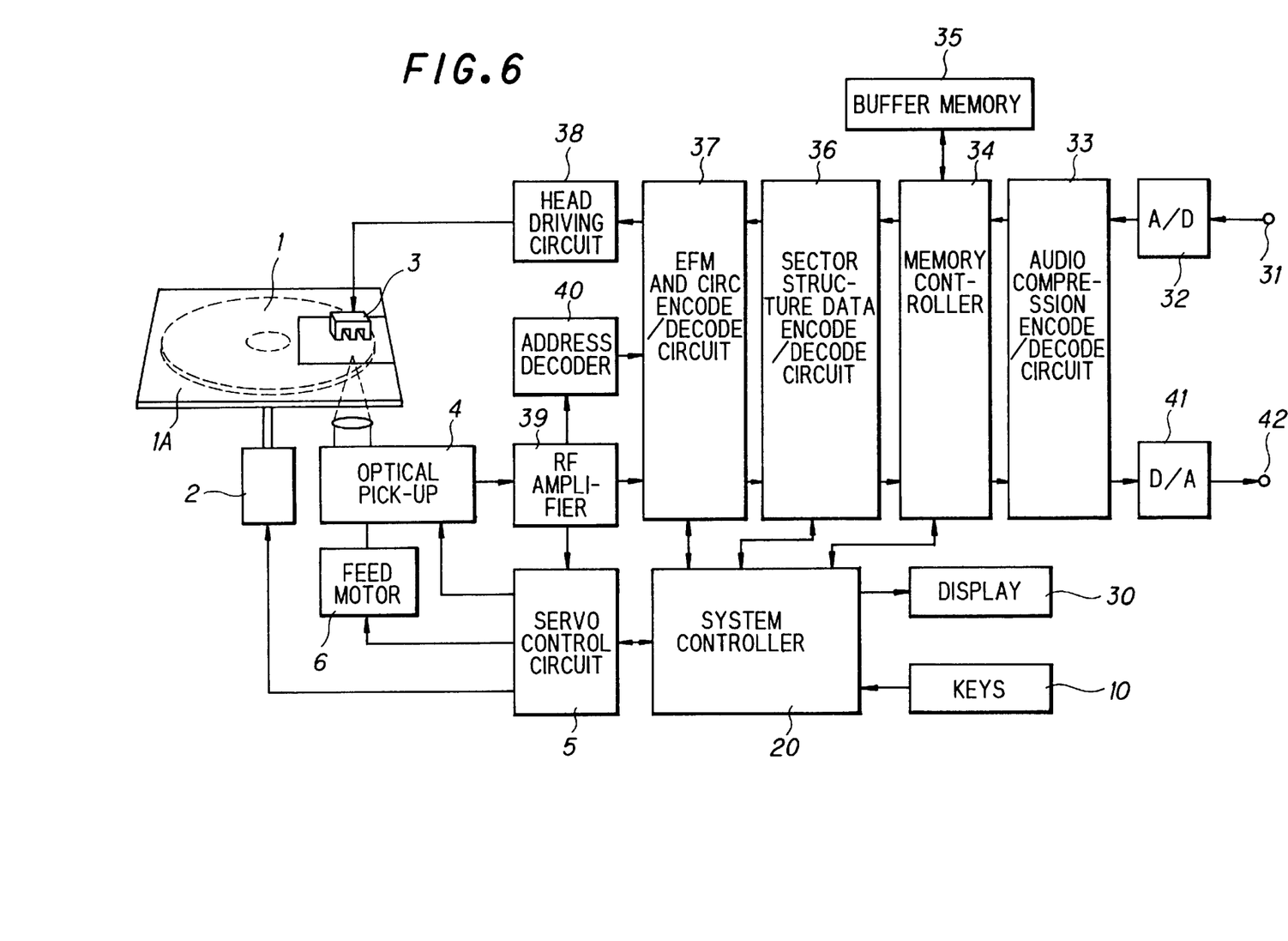
FIG. 6 is a block diagram showing a configuration of a recording and reproducing apparatus according to the present invention.

In FIG. 6, 1 designates a magneto-optical disc as a recording medium. The disc 1 is a disc having a diameter of 64 mm contained in a disc cartridge 1A. The disc cartridge 1A is formed with openings in opposite positions on the top and rear surfaces. A recording area of the magneto-optical disc 1 is exposed to the outside at these openings. The magneto-optical disc 1 is formed in advance with a pregroove for controlling an optical spot (for tracking control). Especially, in this embodiment, absolute address data are recorded in this preformed groove so that they are superimposed on wobbling signals for tracking. As a result, the preformed groove wobbles in the radial direction of the magneto-optical disc according to the address data.

The magneto-optical disc 1 is rotated by a spindle motor 2. The rotation of the spindle motor 2 is controlled by a servo control circuit 5 so that the magneto-optical disc 1 is rotated at a constant linear velocity. A shutter (not shown) is provided on the disc cartridge 1A. The shutter of the disc cartridge 1A is opened when the disc cartridge 1A is placed on a tray provided on the recording and reproducing apparatus and the tray is retracted and loaded into the apparatus. A magnetic head 3 is disposed above and opposite to the one of the openings of the disc cartridge 1A, and an optical pickup 4 is disposed opposite to the underside of the magneto-optical disc 1 exposed at the other opening of the disc cartridge 1A.

The optical pickup 4 is moved in the radial direction of the magneto-optical disc 1 by a feed motor 6. The servo control circuit 5 performs focus control and tracking control over the optical pickup 4.

A system controller 20 is constituted by a microcomputer and manages the operation of the recording and reproducing apparatus as a whole. This system controller 20 is supplied with key input signals from an input portion 10. The input portion 10 is equipped with a power supply key, an eject key, a pause key, a stop key, a record key, a fast forward/ reproduce key, a rewind key, a reproduce key and the like. A display unit 30 is connected to the system controller 20.

Although not shown, the system controller 20 has a memory for storing TOC information read by the optical pickup 4 and recorded on the magneto-optical disc 1 and the P-TOC and U-TOC data as mentioned previously. Processes such as rearrangement of the U-TOC data during erasing to be described later are performed on this memory.

The display unit 30 displays the total play-back time of the magneto-optical disc 1 loaded in the apparatus, the elapsed time of a piece of music being played back, the remaining play-back time of a piece of music being reproduced, time information such as the total remaining play-back time, the track No. for a piece of music being played back and the like. For a disc on which the name of the disc and track names (the so-called titles of pieces of music) are recorded, the disc name and track names are displayed. In addition, if the date and time of recording of the pieces of music or the disc are displayed if recorded.

A recording and reproducing system of the recording and reproducing apparatus shown in FIG. 6 is configured using ICs in an attempt to make the configuration as simple as possible. The mode of the components of this system is switched for recording and reproduction according to mode switching signals from the system controller.

During recording, an analog audio signal is supplied to an input terminal 31. This analog audio signal is converted into a digital signal by an A–D converter 32 at a sampling frequency of 44.1 KHz and with 16 quantization bits.

This digital audio signal is supplied to an audio compression encode/decode circuit 33. In the audio compression encode/decode circuit 33, the audio signal is data-compressed to about one-fifth. The audio signal compression technique used here is, for example, modified discrete cosine transformation.

The audio signal compressed by the audio compression encode/decode circuit 33 is supplied through a memory controller 34 to a buffer memory 35 controlled by the memory controller 34 and is temporarily stored therein. In this embodiment, a DRAM having a data capacity of 1 megabit is used as the buffer memory 35.

Unless there is a track jump which is the jumping of a recording position on the magneto-optical disc 1 due to vibration or the like during recording, the memory controller 34 sequentially reads out the compressed data in the buffer memory 35 at a transfer rate which is approximately five times the rate at which the data have been written and transfers the read data to a sector structure data encode/decode circuit 36.

When a track jump is detected during recording, the memory controller 34 stops the data transfer to the data encode/decode circuit 36 and accumulates the compressed data from the audio compression encode/decode circuit 33 in the buffer memory 35. The controller 34 controls so that the data transfer from the buffer memory 35 to the data encode/decode circuit 36 is resumed when the recording position has been corrected.

The detection of a track jump can be achieved, for example, by providing the apparatus with a vibration meter to detect whether or not the magnitude of a vibration is large enough to cause a track jump. Further, since absolute address data are recorded in the preformed groove of the magneto-optical disc 1 of this embodiment as described above, the absolute address data may be read during recording and decoded to detected a track jump from the output of the decoding. Alternatively, a track jump may be detected by ORing the vibration meter and the absolute address data. When there is a track jump, the output level of the optical beam for recording is reduced or zeroed.

The correction of the recording position on the magneto-optical disc in the case of a track jump can be carried out using the above-mentioned absolute address data. As apparent from the above, the buffer memory 35 must have a memory capacity which is at least sufficient to accumulate compressed data in an amount to cover the time required for correcting the recording position on the magneto-optical disc after the occurrence of a track jump. According to the present invention, the buffer memory 35 has a memory capacity of 1 Megabit as described above, and this memory capacity has been chosen with allowance to be sufficient to satisfy the above-described requirement.

Further, the memory controller 34 controls the buffer memory 35 so that data accumulated therein during normal operations in recording will be minimized. Specifically, when the amount of data in the buffer memory 35 becomes equal to or greater than a predetermined amount, the controller reads a predetermined amount of data, e.g., data corresponding to 32 sectors (one sector means one CD-ROM sector (approximately 2K bytes)) from the buffer memory 35 to control the memory so that a space is always preserved therein to allow at least a predetermined amount of data to be written.

The data encode/decode circuit 36 encodes the compressed data transferred by the buffer memory into data for the structure of sectors of a CD-ROM. Data for 36 sectors including audio data for 32 sectors are hereinafter referred to as a cluster. As will be described later, recording on and reproduction from the magneto-optical disc 1 are performed on a cluster basis.

Data output from the data encode/decode circuit 36 are supplied to an EFM and CIRC encode/decode circuit 37. In this circuit 37, the data are subjected to an encoding process for error detection and correction and a modulation process appropriate for recording which is an EFM (8–14 modulation) process in this embodiment. The error detecting and correcting code in this embodiment is a CIRC (cross interleave Reed Solomon code) for compact discs which has been modified with respect to interleaving. The data to be recorded is intermittent data, and four sectors in total for connecting clusters (hereinafter referred to as linking sectors) are added before and after audio data of 32 sectors to establish one cluster of data to be recorded consisting of 36 sectors. As described above, one cluster of data to be recorded are configured as shown in FIG. 1.

The data to be recorded thus formed are supplied to the magnetic head 3 through a head driving circuit 38. As a result, a vertical magnetic field which has been modulated according to the data to be recorded is applied to the magneto-optical disc 1. Simultaneously, an optical beam is directed to the magneto-optical disc 1 from the optical pickup 4 disposed at the substrate side of the magneto-optical disc 1. During this recording operation, the magneto-optical disc 1 is irradiated by an optical beam having a constant output level which is higher than that used in reproduction. This optical beam directed by the optical pickup 3 and the vertical magnetic field modulated according to the data to be recorded which is supplied by the magnetic head 3 cause the recording of the data on the magneto-optical disc 1. The magnetic head 3 and the optical pickup 4 are configured to be moved in synchronism in the radial direction of the disc 1 by the feed motor 3.

During this recording operation, the output signal of the optical pickup 4 is supplied to an address decoder 40 through an RF amplifier 39 to extract and decode the absolute address data which have been recorded as the wobbles of the preformed groove provided along the track on the magneto-optical disc 1. The detected absolute address data are supplied through the EFM and CIRC encode/decode circuit 37 to the system control circuit 20 to be used for controlling the recognition of the recording position and the position of the optical pickup 4.

The output signal of the RF amplifier 39 is supplied to the servo control circuit 5, and a signal for servo-controlling the spindle motor 2 at a constant linear velocity is formed from the signal obtained by detecting the preformed groove on the magneto-optical disc 1 to perform speed control over the spindle motor 2.

The reproducing operation will now be described. During reproduction, the rotational speed of the spindle motor 2 is controlled by the servo control circuit 5 according to the signal obtained by detecting the preformed groove as in the case of recording so that the magneto-optical disc 1 will be at the same constant linear velocity as in recording.

During reproduction, the optical pickup 4 detects the optical beams reflected by the track of interest on the magneto-optical disc 1 to detect focus errors using, for example, the astigmatism method and to detect tracking errors using, for example, the push-pull method. It also detects the difference between the angles of polarization of the reflected beams from the track of interest to output a reproduction RF signal.

The output signal of the optical pickup 4 is supplied to the RF amplifier 39. According to the output signal of the optical pickup 39, the RF amplifier 39 generates a focus error signal and a tracking error signal which are supplied to the servo control circuit 5 and converts the reproduction RF signal into a binary signal which is supplied to the EFM and CIRC encode/decode circuit 37.

The servo control circuit 5 performs focus control over the optical system of the optical pickup 4 so that the focus error signal supplied by the RF amplifier 39 will be zeroed and performs tracking control over the optical system of the optical pickup 4 so that the tracking error signal will be zeroed.

The output signal of the RF amplifier 39 is supplied to the address decoder 40 to extract and decode the absolute address data in the preformed groove. The absolute address data from the decoder 40 are supplied to the system control circuit 20 through the circuit 37 to be used by the servo control circuit 5 for control over the position of reproduction in the radial direction of the disc performed by the optical pickup 4. The system control circuit 20 can use also address information on a sector basis extracted from the data to be reproduced for managing the position on the recording track being scanned by the optical pickup 4.

During this reproduction operation, the compressed data read out from the magneto-optical disc 1 is written into the buffer memory 35 and read out therefrom to be decompressed by the audio compression encode/decode circuit 33. Since the transfer rate for the writing of the data into the buffer memory 35 is different from the transfer rate for the readout of the data from the memory 35, the memory controller 34 controls the data writing and readout into and from the memory 35 so that the data readout from the magneto-optical disc 1 by the optical pickup 4 is intermittently performed, for example, to maintain the data accumulated in the buffer memory 35 above a predetermined amount.

In the EFM and CIRC encode/decode circuit 37, the data supplied through the RF amplifier 39 are EMF-modulated and are subjected to an error correcting process. The output of the EFM and CIRC encode/decode circuit 37 is supplied to the sector structure data encode/decode circuit 36 wherein the sector structure of the CD-ROM is destructed and the data are decoded into the original data in a compressed state.

The output of the data encode/decode circuit 36 is temporarily stored in the buffer memory 35 through the memory controller 34. Unless there is a track jump which is the jumping of the reproduction position due to vibration and the like during reproduction, the memory controller 34 sequentially reads out the data in a compressed state from the circuit 36 at a transfer rate which is approximately five times the writing rate and transfers the read data to the audio compression encode/decode circuit 33. At this time, the memory controller 34 controls the writing and readout to and from the buffer memory 35 so that the amount of data stored in the buffer memory 35 will not be reduced below a predetermined value.

When a track jump is detected during reproduction, the controller stops the writing of the data from the data encode/decode circuit 36 to the buffer memory 35 and performs only the data transfer to the circuit 33. When the reproduction position has been corrected, it performs control such that the writing of data from the circuit 36 to the buffer memory 35 is resumed.

As previously described, the memory controller 34 performs memory control so that a predetermined amount of data in the excess of the minimum amount required are accumulated in the buffer memory 35 during normal operations. For example, when the amount of the data in the buffer memory 35 is reduced below a predetermined amount, the controller performs memory control so that a readout space equal to or greater than predetermined amount of data is always reserved by intermittently fetching the data from the magneto-optical disc 1 using the optical pickup 4 and by writing the data from the data encode/decode circuit 36.

It takes about 0.9 seconds to read data into the buffer memory 35 to its full capacity, and such data correspond to an analog audio signal for about 3 seconds. In other words, if data are accumulated in the buffer memory 35 to its full capacity, even after the reading of data from the magneto-optical disc 1 is disabled, the reproduction signal can be output from an output terminal 42 for about 3 seconds, during which period the optical pickup 4 can be caused to re-access the previous position on the magneto-optical disc 1 to resume the reading of data, thereby preventing any sound from being skipped.

The digital signal decompressed by the audio compression encode/decode circuit 33 is supplied to a D–A converter 41 to be re-converted into an analog signal. This analog signal is output from the output terminal 42.

A TOC (table of contents) is provided along the innermost circumference of a magneto-optical disc 1. What are written in the TOC are the start and end addresses of each piece of music on the disc, track names which are the names of the pieces of music, a disc name which is the name of the disc and the like. As described above, the data structure of a TOC is constituted by a P-TOC and a U-TOC. The structure of a sector 0 of a U-TOC is as shown in FIG. 3. When a magneto-optical disc 1 is loaded into the apparatus, such TOC information is read by the optical pickup 4 and is stored in a memory in the system controller 20.

[Operation in Additional Recording]

During additional recording, a stereophonic analog audio signal is supplied to the A–D converter 32 through the input terminal 31 to be A–D-converted into a digital audio signal at a sampling frequency of 44.1 KHz and with 16 quantization bits. This digital audio signal is supplied to the audio compression encode/decode circuit 33 to be data-compressed to an amount of data which is about one-fifth of the original data using, for example, modified discrete cosine transformation.

The compressed audio data are temporarily written into the buffer memory 35 by the memory controller 34 and are sequentially read out from the buffer memory 35 at a rate which is about five times the rate at which the data have been written. The read audio data are supplied to the data encode/decode circuit 36 and are encoded into the sector structure data as described above.

The encoded audio data are supplied to the EFM and CIRC encode/decode circuit 37. The data are subjected to an encoding process for error detection and correction and a modulation process appropriate for recording which is an EFM (8–14 modulation) process in this embodiment. The error detecting and correcting code in this embodiment is a CIRC (cross interleave Reed Solomon code) for compact discs which has been modified with respect to interleaving. Further, linking sectors L2–L4 and L1 are added at the encode/decode circuit 37 to provide audio data having the cluster structure as described above.

The audio data are supplied to the magnetic head 3 through the head driving circuit 38, and a vertical magnetic field modulated according to the audio data are applied to the magneto-optical disc 1. At this time, an optical beam is directed to the magneto-optical disc 1 from the optical pickup 4, and the magnetic head 3 and the optical pickup 4 are moved in synchronism by the feed motor 6 in the radial direction of the disc 1. The optical beam directed by the optical pickup 3 and the vertical magnetic field supplied by the magnetic head 3 cause the recording of the audio data on the magneto-optical disc 1. Further, since this is additional recording of audio data on the magneto-optical disc 1, when a new part Pj is formed as a result of this recording, a non-recording area $C_x$ of comprising one cluster is formed between the part Pj and a part Pi which precedes the part Pj.

During this additional recording, the output signal of the optical pickup 4 is supplied to the address decoder 40 through the RF amplifier 39. Then, an address signal indicating the absolute position recorded in the preformed groove on the magneto-optical disc 1 is extracted and is decoded by the address decoder 40.

The address signal indicating the absolute position is supplied through the EFM and CIRC encode/decode circuit 37 to the system controller 20 to be used for controlling the recognition of the recording position and the positions of the optical pickup 4 and magnetic head 3. Further, the output signal of the RF amplifier 39 is supplied to the servo control circuit 5, and the spindle motor 2 is servo-controlled so that the magneto-optical disc 1 will be at a constant linear velocity in accordance with a detection signal obtained by detecting the preformed groove on the magneto-optical disc 1.

During this recording operation, the recording position on the magneto-optical disc 1 is determined based on U-TOC information in a work area of the above-described system controller 20, and the U-TOC information is updated in accordance with the recording of data on the magneto-optical disc 1. When a key operation is performed to eject the magneto-optical disc 1 from the apparatus after the additional recording operation is completed, the U-TOC information stored in the work area of the system controller 20 is written into the magneto-optical disc 1, and the U-TOC information on the magneto-optical disc 1 is updated in accordance with the additional recording operation.

[Operation in Overwrite Recording]

In the case of overwrite recording, audio data are processed in the same manner as that in the above-described "operation in additional recording". Also, the updating of the U-TOC information and the control over the recording position on the magneto-optical disc 1 are the same as those in "operation in erasing" to be described later.

[operations in Erasing]

Figure 8A:
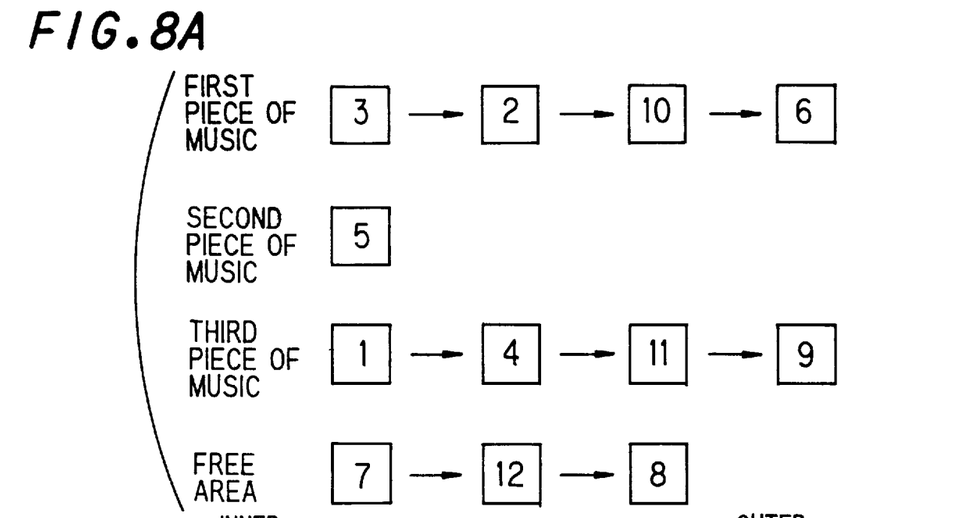
FIG. 8A illustrates a data table used in a first embodiment of the present invention.

For simplicity, it is now assumed that there are 12 parts in the recording area of the magneto-optical disc 1 including free areas and that these 12 parts "1"–"12" are used as shown in FIG. 8A. For example, the first piece of music consists of parts "3", "2", "10" and "6", and these parts are reproduced in the above-mentioned order.

Figure 7:
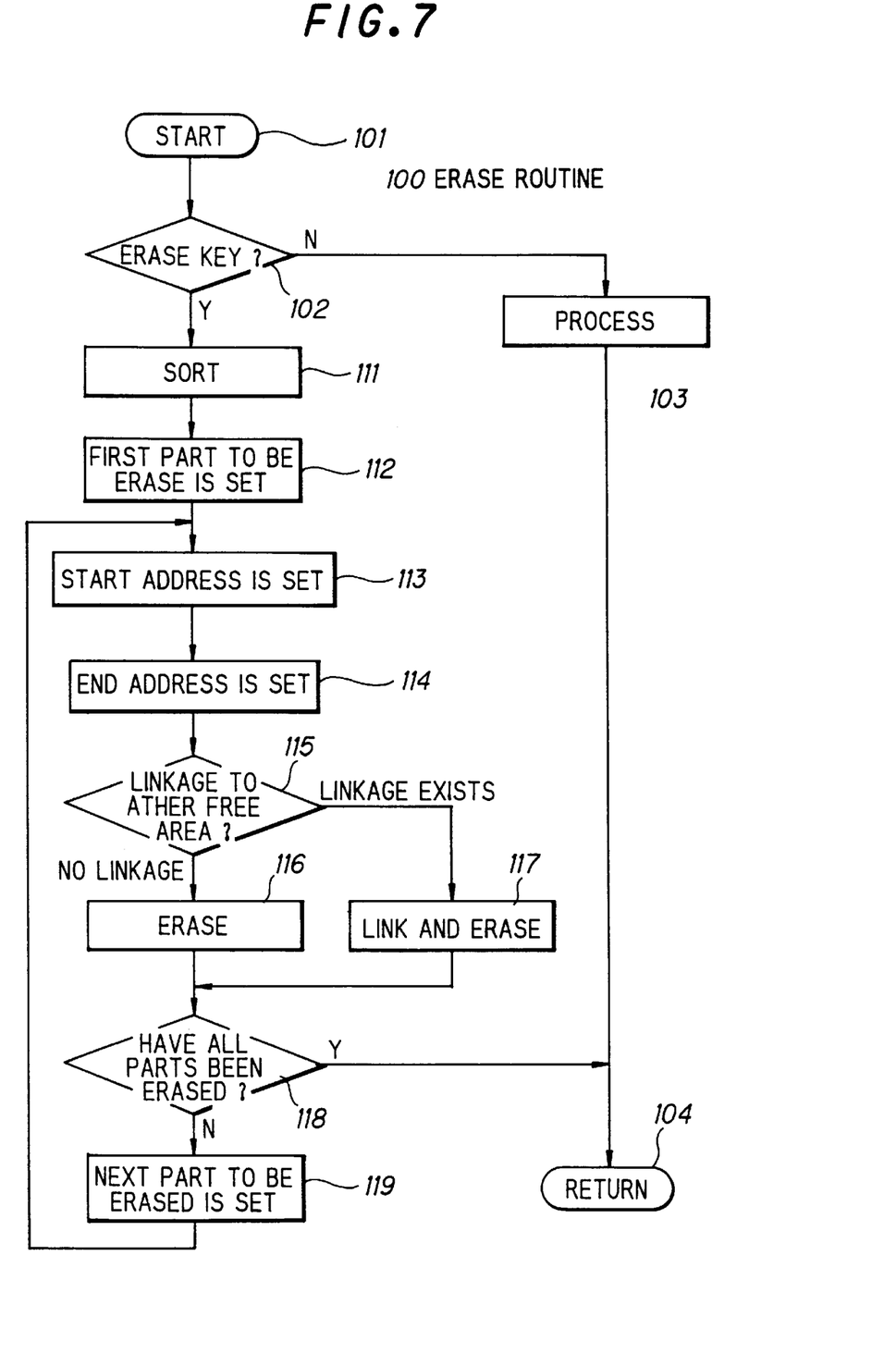
FIG. 7 is a flow chart showing an erasing process according to the present invention.

When the erase key of the input portion 10 is operated, the system controller 20 executes an erase routine 100 wherein the relevant part along with the preceding and succeeding non-recording areas $C_x$ is registered in the system controller 20 as a free area and is erased. Specifically, a push on an arbitrary key causes the process at the system controller 20 to start at step 101 of the routine 100, and it is judged at step 102 whether the pushed key is the erase key. If it is judged at step 102 that the operated key is not the erase key, the process proceeds from step 102 to step 103. At step 103, the process associated with the pushed key, for example, the above-described "operation in reproduction" is executed. Thereafter, when the reproducing operation is terminated or when the step key is operated, the process proceeds to step 104. At step 104, the routine 100 is completed.

Figure 8B:
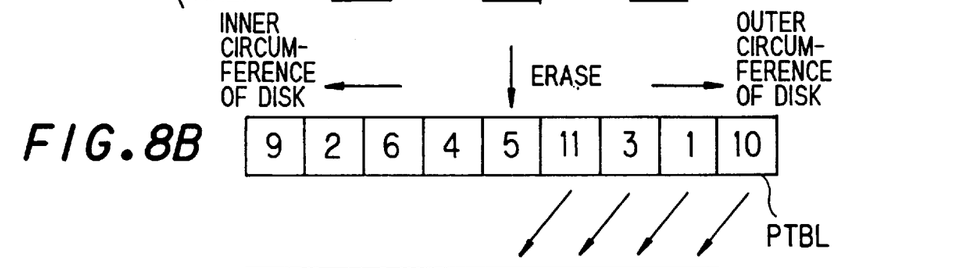
FIG. 8B illustrates a data table used in a first embodiment of the present invention.

However, if it is judged that the key pushed when the routine 100 was started is the erase key, the process proceeds from step 102 to step 111 at which, for example, a parts table PTBL on which the part numbers "1"–"12" of the parts "1"–"12" are rearranged is formed as shown in FIG. 8B. This rearrangement is carried out in the order of the physical addresses of those parts on the magneto-optical disc 1, i.e., the positions on the track on the magneto-optical disc 1 in which those parts are recorded using address information in the U-TOC, and the result of this rearrangement is the parts table PTBL. Specifically, FIG. 8B shows a parts table which is the result of such rearrangement in a case wherein the parts "9", "2", . . . "10" are formed from the inner circumference toward the outer circumference of the magneto-optical disc 1 in the order shown.

Once this parts table PTBL is formed, the process proceeds to step 112 at which the first part of the piece of music to be erased is set. For example, if the first piece of music is to be erased, the part "3" is set and, if the second piece of music is to be erased, the part "5" is set. For simplicity, it is assumed that the second piece of music is to be erased according to the following description. Therefore, the part "5" is set as the first part of the piece of music to be erased.

The process then proceeds to step 1134 at which an erasing start address ES is set as follows.

ES=(the end address of the part preceding the part set at step 112)+(one sound group)

In this case, the part "5" has been set as the first part of the piece of music to be erased, and the part "4" precedes this part "5" according to the parts table PTBL. The value obtained by adding one sound group to the end address of the part "4" is set as the erasing start address ES. The part preceding the part set at step 112 is retrieved with reference to the parts table PTBL.

Figure 9A:
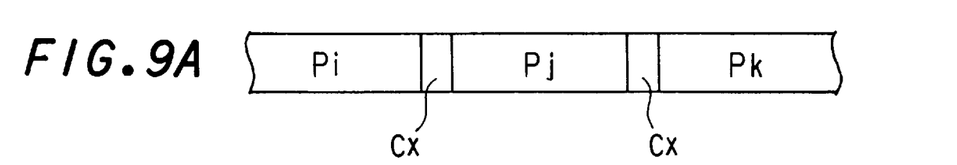
FIG. 9A illustrates the contents of the processes in the flow chart shown in FIG. 7.

Assume that the part set at step 112 is the part Pj shown in FIG. 9A. In this case, the part Pi preceding the part Pj is retrieved with reference to the parts table PTBL. The start address ES for a non-recording area $C_x$ preceding the part Pj is obtained by adding one sound group to the end address of the retrieved part Pi. When the part to be erased is located at the innermost circumference of the magneto-optical disc 1, a start address where recording can be performed is set as the erasing start address ES.

After the erasing start address ES is obtained at step 113, the process proceeds to step 114 at which an erasing end address EE is set as follows.

EE=(the end address of the part succeeding the part set at step 112)–(one sound group) In this case, the part "5" has been set as the first part of the piece of music to be erased, and the part "11" succeeds this part "5" according to the parts table PTBL. The value obtained by subtracting one sound group from the start address of the part "11" is set as the erasing end address EE. The part succeeding the part set at step 112 is retrieved with reference to the parts table PTBL.

Assume that the part set at step 112 is the part Pj shown in FIG. 9A. In this case, the part Pk succeeding the part Pj is retrieved with reference to the parts table PTBL. The end address EE for a non-recording area $C_x$ succeeding the part Pj is obtained by subtracting one sound group from the start address of the retrieved part Pk. When the part to be erased is located at the outermost circumference of the magneto-optical disc 1, the value obtained by subtracting one sound group from a readout address is set as the erasing end address EE.

Therefore, when the part Pj is erased at steps 113 and 114, the non-recording areas $C_x$ before and after the part Pi are also erased.

Assume that the part to be erased (including the preceding and succeeding non-recording areas $C_x$) is the part Pj. Then, there are possible situations as follows:

(1) As shown in FIG. 9A, both of the parts Pi and Pk preceding and succeeding the part, Pj are parts wherein audio data are recorded.

Figure 10A:
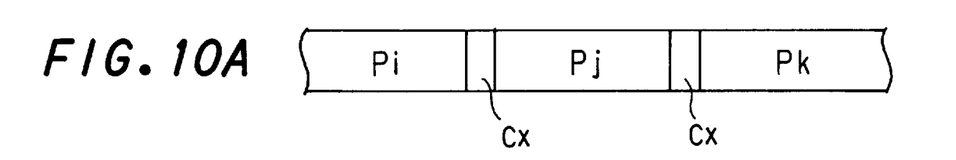
FIG. 10A illustrates the contents of the processes in the flow chart shown in FIG. 7.

(2) As shown in Fig. 10A, the part Pfi preceding the part Pj is a free area and the succeeding part Pk is a part wherein audio data are recorded.

Figure 11A:
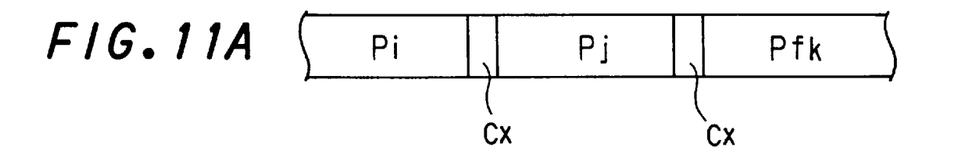
FIG. 11A illustrates the contents of the processes in the flow chart shown in FIG. 7.
Figure 11B:
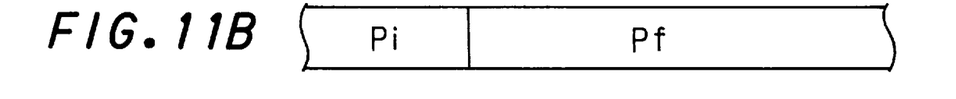
Fig. 11B illustrates the contents of the processes in the flow chart shown in FIG. 7.

(3) As shown in FIG. 11A, the part Pi preceding the part Pj is a part wherein audio data are recorded and the succeeding part Pfk is a free area.

Figure 12A:
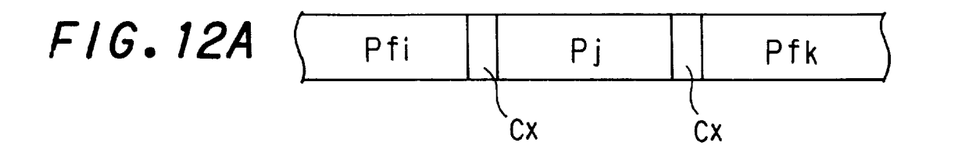
FIG. 12A illustrates the contents of the processes in the flow chart shown in FIG. 7.

(4) As shown in FIG. 12A, both of the parts Pfi and Pfk preceding and succeeding the part Pj are free areas.

In the case (1), even if the part Pj and the preceding and succeeding non-recording areas $C_x$ are erased to set a new free area, this new free area will not be physically continuous with other free areas because it is preceded and succeeded by the parts Pi and Pk, respectively, wherein audio data are recorded. In the cases (2), (3) and (4), however, when the part Pj and the preceding and succeeding non-recording areas $C_x$ are erased to set a new free area, this new free area will be physically continuous with preceding free area Pfi and/or the succeeding free area Pfk.

Then, the process proceeds to step 115. At step 115, it is judged whether the new free area created as a result of the erasure is continuous with other free areas Pfi and Pfk.

Figure 9B:
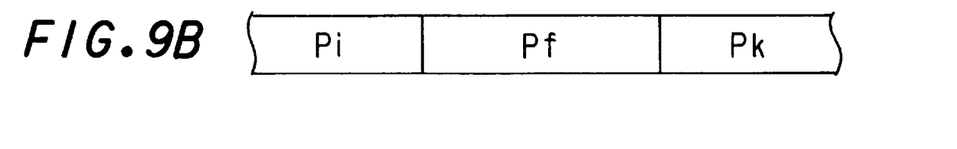
FIG. 9B illustrates the contents of the processes in the flow chart shown in FIG. 7.

In the case (1), i.e., in the case whereon the new free area is not continuous with other free areas as shown in FIG. 9A, the process proceeds from step 115 to step 116. At step 116, the U-TOC data kept in the work area of the system controller 20 is modified into data indicating that the area ranging from the erasing start address ES set at step 114 to the erasing end address EE set at step 114 is a free area. In the case shown in FIG. 9A, therefore, the clusters ranging from the cluster succeeding the part Pj to the cluster preceding the part Pk establish a new free area Pf as shown in FIG. 9B.

In this case, among those parts which had been free areas before the execution of the routine 100, the finally linked free area was the part "8" as shown in FIG. 8A. So, among the U-TOC data kept in the work area of the system controller 20, the link pointer Link-P succeeding the end address indicating the end position of this free area "8" is rewritten to indicate the start address of the part "5". Since the part "5" has been erased to become a free area, the link pointer Link-P succeeding the end address indicating the end position of this free area "5" is rewritten into 0.

Figure 8C:
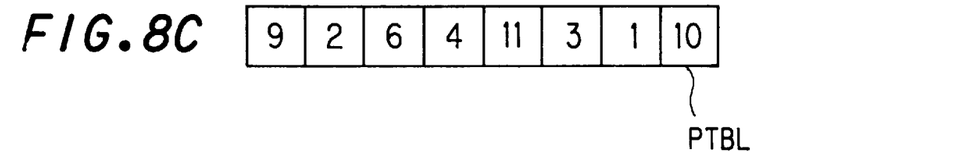
FIG. 8C illustrates a data table used in a first embodiment of the present invention.

In addition, as shown in FIG. 8C, the part number "5" is deleted from the parts table PTBL and the subsequent part numbers are moved up by one. Specifically, the part number corresponding to the part which has been erased is deleted and the parts numbers subsequent to the deleted part number are moved up by one on the parts table PTBL.

On the other hand, if it is judged at step 115 that the new free area is continuous with other free areas as in the cases (2), (3) and (4) (Fig. 10A, Fig. 11A and FIG. 12A), the process proceeds to step 117. At step 117, the area ranging from the erasing start address ES set at step 113 to the erasing end address EE set at step 114 is regarded as a free area. At the same time, this free area and the preceding free area Pfi and/or the succeeding free area Pfk are linked and regarded as one new free area. As a result, the U-TOC data kept in the work area of the system controller 20 are modified to show the start and end addresses of this linked new free area.

Figure 10B:
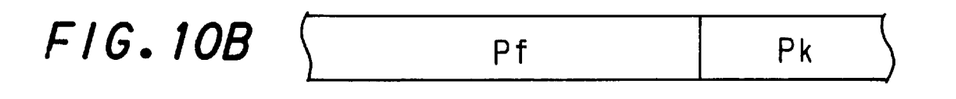
FIG. 10B illustrates the contents of the processes in the flow chart shown in FIG. 7.
Figure 12B:
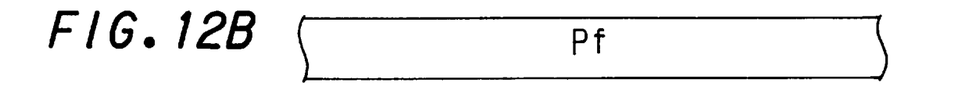
FIG. 12B illustrates the contents of the processes in the flow chart shown in FIG. 7.

Therefore, in the case shown in FIG. 10A (the case (2) as described above), the area ranging from the part Pfi to the cluster preceding the part Pk becomes a new free area Pf as shown in Fig. 10B. In the case shown in FIG. 11A (the case (3) as described above), the area ranging from the cluster succeeding the part Pi to the part Pfk becomes a new free area Pf as shown in Fig. 10B. In the case shown in FIG. 12A (the case (4) as described above), the area ranging from the part Pfi to the part Pfk becomes a new free area Pf as shown in FIG. 12B.

Then, the process proceeds from step 116 or 117 to step 118. At step 118, it is checked whether the above-described erasing process has been carried out on all parts to be erased. If there are further parts to be erased, the process proceeds from step 118 to step 119. The next part to be erased is set at step 119, and the process returns to step 113. Thus, the above-described process is repeated for the next part.

When the above-described erasing process has been carried out for all parts to be erased, the process proceeds from step 118 to step 104 to terminate this erasing routine 100. The U-TOC data kept in the work area of the system controller 20 are written into the U-TOC of the TOC area of the magneto-optical disc 1, for example, before the eject key at the input portion 10 is operated to eject the magneto-optical disc 1 from the main body of the apparatus or before the power supply key at the input portion 10 is operated to turn the power supply of the apparatus off. After the data are written into the U-TOC, the magneto-optical disc 1 is ejected from the main body of the apparatus or the power supply of the apparatus is turned off.

As described above, during erasing, the non-recording areas $C_x$ preceding and succeeding the part Pj to be erased are also regarded as the part Pj and changed into the free area Pf. This makes it possible to prevent areas available for the actual recording of data in the recording area of the magneto-optical disc 1 from being reduced.

Especially, according to the present invention, there is provided a parts table PTBL which shows part numbers arranged in the order of the physical addresses on a magneto-optical disc 1 of parts, and the addresses of the non-recording areas $C_x$ preceding and succeeding a part Pj to be erased are obtained from the addresses of parts Pi and Pk preceding the part Pj to be erased with reference to the parts table PTBL. As a result, although non-recording areas $C_x$ are not managed by the U-TOC, an area to be erased can be quickly set. Therefore, a piece of music which utilizes many parts or pieces of music can be erased in a short period of time. Experiments have shown that erasing time of two minutes required for conventional recording apparatuses could be reduced to about 30 seconds in the worst case.

When a part Pj and the non-recording areas $C_x$ preceding and succeeding the part Pj are changed to a new free area as a result of erasure, if there is a free area Pfi preceding the part Pj and/or a free area Pfk succeeding the part Pj which are physically continuous with the new free area as shown in FIG. 10A, FIG. 11A and FIG. 12A, the part Pj and the free area Pfi preceding the part Pj and/or the free area Pfk succeeding the part Pj are combined into one new free area Pf. Therefore, if the number of parts is limited to a maximum of 255 pieces, the recording area of a magneto-optical disc 1 can be effectively used.

Figure 13A:
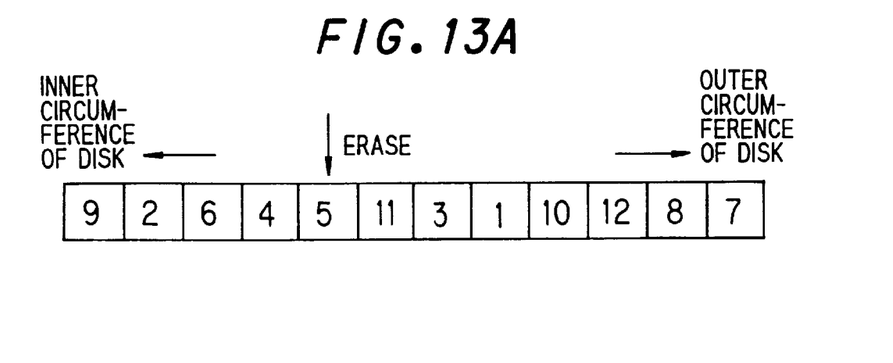
FIG. 13A illustrates a data table used in a second embodiment of the present invention.
Figure 13B:
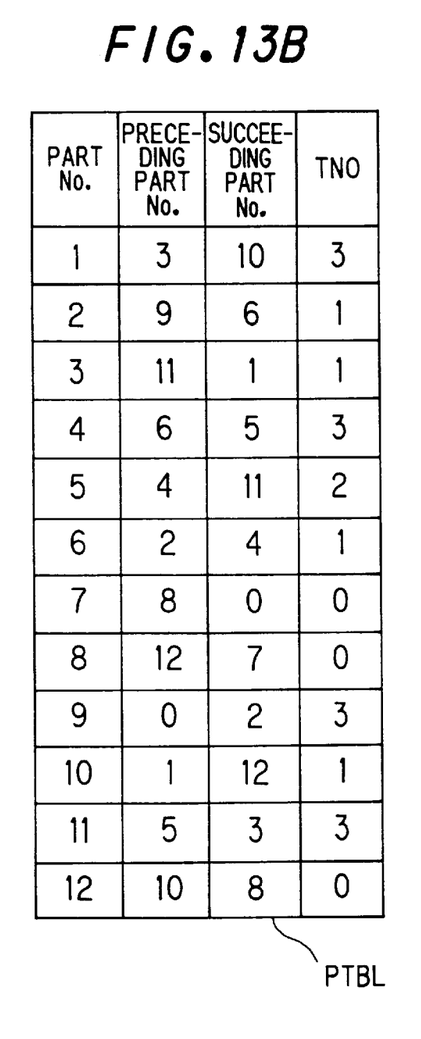
FIG. 13B illustrates the data table used in a second embodiment of the present invention.
Figure 13C:
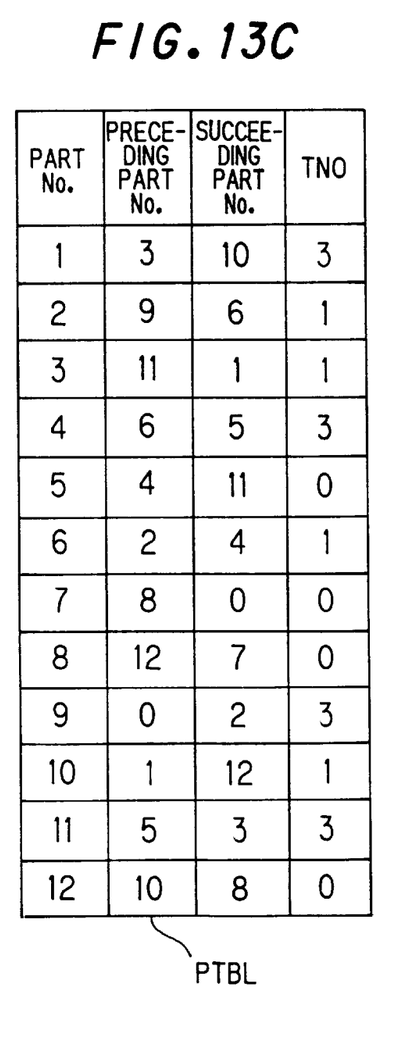
FIG. 13C illustrates the data table used in a second embodiment of the present invention.

A second embodiment of the present invention will now be with reference to FIG. 13A, FIG. 13B and FIG. 13C. In this second embodiment, it is also assumed that 12 parts numbered "1"–"12" are used in total as shown in FIG. 8A. The recording addresses of these parts "1" through "12" on a magneto-optical disc 1 are in the order as shown in FIG. 13A (the order is the same as that shown in FIG. 8B except the three parts on the right-hand side).

In this second embodiment, in step 111 shown in FIG. 7, a parts table PTBL is formed, for example, as shown in FIG. 13B in accordance with information in the U-TOC. This parts table PTBL lists the part number of each part associated with the part numbers for the parts preceding and succeeding the part and the track number (title Number) TNO. For example, since the part "1" is preceded by the part "3" and succeeded by the part "10", FIG. 13 A shows "3" and "10" as preceding and succeeding part numbers, respectively, in the column of the part number "1". Further, since the part "1" is used in the third piece of music, "3" is written in as the track number.

Since the part "9" is headed by a recording address, the column of the part number "9" on the table PTBL shows "0" as the preceding part number. Similarly, the end of the part "7" is a recording address, the columns of the part numbers "12", "8" and "7" on the table PTBL show "0" as the track number.

For example, if the part "5" is to be erased, it is detected at steps 113 and 114 that the part numbers of the parts preceding and succeeding the part number "5" are "4" and "11", respectively with reference to the table PTBL, and an erasing start address ES and an erasing end address EE are obtained form the part numbers "4" and "11".

When it is judged at step 115 whether there is the free area Pfi and/or Pfk before and/or after the part Pj to be erased and the non-recording areas $C_x$ before and after the part Pj, the judgement is also carried out with reference to the table PTBL. In this case, the part "5" is preceded by the part "4". The column of the part number "4" for this part "4" shows "3" as the track number, which means that the part "4" is not a free area. Similarly, the part "5" is preceded by the part "11"; the column of the part number "11" for this part "11" shows "3" as the track number meaning that the part "11" is not a free area.

Thus, it is judged whether the part Pj to be erased is preceded by the free area Pfi and/or succeeded by the free area Pfk with reference to the table PTBL.

Thereafter, the same erasing process on the table PTBL as described with reference to FIG. 8B and FIG. 8C is performed. As a result of the erasing process, the U-TOC information is updated.

Further, since the part "5" has been erased and changed to a free area, the column of the part number "5" on the parts table PTBL is changed to show a track number "0" as shown in FIG. 13C. As apparent from FIG. 9A, the part "5" follows the part "8".

Since this parts table PTBL can be formed quickly, the time required for erasing can be reduced. In the case of the parts table PTBL shown in FIG. 9B, the information of part numbers and the start addresses of those parts must be obtained from the U-TOC and rearranged in the order of the recorded addresses using the start addresses. In the case of the parts table PTBL shown in FIG. 13B, however, since such a rearrangement process is not required, the parts table PTBL can be formed more quickly. Consequently, the time required for erasing can be reduced.

The parts table is prepared on the magneto-optical disc 1 and the parts table PTBL is used by copying it from the magneto-optical disc 1 to the work area of the system controller 20 at step 111. When the copied parts table PTBL has been changed, the copied parts table PTBL may be written into the TOC area of the magneto-optical disc 1. The process at step 111 may be performed when the magneto-optical disc 1 is loaded into the apparatus.

While specific illustrated embodiments have been shown and described, it will be appreciated by those skilled in the art that various modifications, changes and additions can be made to the invention without departing from the spirit and scope thereof as set forth in the following claims.

What is claimed is:

1. A method for recording digital data utilizing a digital recording system having a recording medium which includes a recording area, the method comprising the steps of:

recording a first digital sequence in the recording area, wherein a first non-recordable area precedes said first digital sequence and a second non-recordable area follows said first digital sequence; and erasing said first digital sequence and said first and second non-recordable areas pursuant to a command to erase said first digital sequence.

2. A method for recording digital data as in claim 1, further comprising the step of combining said first digital sequence and said first and second non-recordable areas into a first free sequence.

3. A method for recording digital data as in claim 1, said recording step further comprising the steps of:

recording a start address and an end address of said first digital sequence in a management area of said recording medium; and erasing said start address of said first digital sequence and said end address of said first digital sequence.

4. A method for recording digital data as in claim 1, wherein said recording area further includes a second digital sequence preceding said first non-recordable area and a third digital sequence following said second non-recordable area, and said recording medium further includes a management area having digital data representing a start address and an end address for said second digital sequence and a start address and an end address for said third digital sequence, said erasing step comprising erasing data from the recording area sequentially beginning with a first address succeeding said end address of the second digital sequence, and ending with a last address preceding said start address of said third digital sequence.

5. A method for recording digital data as in claim 4 further comprising the steps of:

combining said first digital sequence and said first and second non-recordable areas into a first free sequence;

recording in the management area a first address succeeding said end address of said second digital sequence as a start address of the first free sequence;

recording in the management area a last address preceding said start address of said third-digital sequence as an end address of the first free sequence.

6. A method for recording digital data as in claim 5, said management area further including a start address of said first digital sequence and an end address of said first digital sequence, said method further comprising the step of erasing from the management area said start address of said first digital sequence and said end address of said first digital sequence.

7. A method for recording digital data as in claim 4, wherein said second digital sequence is a second free sequence having a start address and an end address, said method further comprising the step of combining said first digital sequence and said first and second non-recordable areas with said second free sequence to form a single free sequence.

8. A method for recording digital data as in claim 7 further comprising the steps of:

recording in the management area the start address of the second free sequence as a start address of the single free sequence;

recording in the management area the last address preceding the start address of said third digital sequence as an end address of the single free sequence; and erasing from the management area the end address of the second free sequence.

9. A method for recording digital data as in claim 4, wherein said third digital sequence is a second free sequence having a start address and an end address, said method further comprising the step of combining said first digital sequence and said first and second non-recordable areas with said second free sequence to form a single free sequence.

10. A method for recording digital data as in claim 9 further comprising the steps of:

recording in the management area the first address succeeding the end address of the second digital sequence as a start address of the single free sequence;

recording in the management area the end address of the second free sequence as an end address of the single free sequence; and erasing from the management area the start address of the second free sequence.

11. A method for recording digital data as in claim 4, wherein said second digital sequence is a second free sequence having a start address and an end address, and said third digital sequence is a third free sequence having a start address and an end address, said method further comprising the step of combining said first digital sequence and said first and second non-recordable areas with said second free sequence and said third free sequence to form a single free sequence.

12. A method for recording digital data as in claim 11 further comprising the steps of:

recording in the management area the start address of the second free sequence as a start address of the single free sequence;

recording in the management area the end address of the third free sequence as an end address of the single free sequence; and erasing from the management area the start address of the third free sequence and the end address of the second free sequence.

13. A method for recording digital data as in claim 1, wherein each digital sequence comprises at least one part, and said management area further includes digital data representing an order by which each said part is to be read in response to a read command from said system controller, said method further comprising the step of recording in the management area the order by which each said at least one part is read in response to a read command from said system controller along with the digital or free sequence comprising each said at least one part, and a preceding part which is read sequentially before each said at least one part, and a succeeding part which is read sequentially after each said at least one part, wherein said erasing step erases data succeeding each preceding part and preceding each succeeding part of each said at least one part comprising said first digital sequence.

14. A method for recording digital data as in claim 13, further comprising the step of recording a table in the management area comprising an order by which each said digital sequence is to be read and an order by which each said part of each said digital sequence is to be read.

15. A method for recording digital data as in claim 4, further comprising the step of recording a table in the management area comprising an order by each digital sequence and each free sequence is stored physically on the recording medium.

16. An apparatus for recording digital data comprising:

a recording medium including a recording area having a first digital sequence which follows a first non-recordable area and precedes a second non-recordable area; and a magnetic head in magnetic communication with said recording medium;

an optical pick-up in optical communication with said recording medium;

a system controller in electronic communication with the magnetic head and optical pick-up, wherein said first digital sequence and said first and second non-recordable areas are erased by said magnetic head and said optical pick-up, when said system controller communicates a command to erase said first digital sequence to said magnetic head and said optical pick-up.

17. An apparatus for recording digital data as in claim 16, wherein said recording area further includes, a second digital sequence preceding said first non-recordable area;

a third digital sequence following said second non-recordable area; and a management area including digital data representing a start address and an end address for said second digital sequence and a start address and an end address for said third digital sequence, wherein data recorded between said end address of said second digital sequence and said start address of said third digital sequence are erased, when said system controller communicates said command to erase said first digital sequence to said magnetic head and said optical pick-up.

18. An apparatus for recording digital data as in claim 17, wherein said management area further includes a start address of said first digital sequence and an end address of said first digital sequence, wherein said start address of said first digital sequence and said end address of said first digital sequence are erased, when said system controller communicates said command to erase said first digital sequence to said magnetic head and said optical pick-up.

* * * * *